J. C. CORAM.
MACHINE FOR WINDING CONES AND TUBES.
APPLICATION FILED JAN. 20, 1908.

980,069.

Patented Dec. 27, 1910.
11 SHEETS—SHEET 1.

Fig. 1.

Witnesses:
Ludger A. Nicol.
Grace Crowley.

Inventor:
John C. Coram,
By Albert M. Moore
His Attorney

J. C. CORAM.
MACHINE FOR WINDING CONES AND TUBES.
APPLICATION FILED JAN. 20, 1908.

980,069.

Patented Dec. 27, 1910.
11 SHEETS—SHEET 2.

Fig. 2.

J. C. CORAM.
MACHINE FOR WINDING CONES AND TUBES.
APPLICATION FILED JAN. 20, 1908.

980,069.

Patented Dec. 27, 1910.
11 SHEETS—SHEET 3.

J. C. CORAM.
MACHINE FOR WINDING CONES AND TUBES.
APPLICATION FILED JAN. 20, 1908.

980,069.

Patented Dec. 27, 1910.
11 SHEETS—SHEET 5.

J. C. CORAM.
MACHINE FOR WINDING CONES AND TUBES.
APPLICATION FILED JAN. 20, 1908.

980,069.

Patented Dec. 27, 1910.
11 SHEETS—SHEET 10.

Witnesses:
Ludger A. Nicol
Grace Crowley

Inventor:
John C. Coram,
By Albert M. Moore,
His Attorney.

J. C. CORAM.
MACHINE FOR WINDING CONES AND TUBES.
APPLICATION FILED JAN. 20, 1908.

980,069.

Patented Dec. 27, 1910.
11 SHEETS—SHEET 11.

Witnesses:
Ludger A. Nicol.
Grace Crowley.

Inventor:
John C. Coram,
By Albert M. Moore,
His Attorney.

UNITED STATES PATENT OFFICE.

JOHN C. CORAM, OF LOWELL, MASSACHUSETTS.

MACHINE FOR WINDING CONES AND TUBES.

980,069.  Specification of Letters Patent.  Patented Dec. 27, 1910.

Application filed January 20, 1908. Serial No. 411,784.

*To all whom it may concern:*

Be it known that I, JOHN C. CORAM, a citizen of the United States, residing at Lowell, in the county of Middlesex and Commonwealth of Massachusetts, have invented a certain new and useful Improvement in Machines for Winding Cones and Tubes, of which the following is a specification.

This invention relates to machines for winding cones and tubes.

The machine hereinafter shown and described is specially designed for winding cones, such as form the subject of United States Patent, No. 555,564, granted March 3, 1896, to myself and assignee, but said machine may be adapted to wind cylindrical tubes by the substitution of cylindrical mandrels for the conical mandrels shown in the drawings which accompany this specification. Said machine is adapted to take a strip of paper or similar sheet material, to apply paste to said strip and to wind said strip spirally into a cone; to sever the cone from the strip; to lay the lap; to retain the cone so wound upon the mandrel until said cone is dry enough to retain its form; to lay and burnish the lap on the inside of the small end of the cone; and to discharge said cone from its mandrel;—there being a series of mandrels, on one of which a cone is being formed simultaneously with the discharge of the cone which has been the longest time on its mandrel.

This invention comprises means for stopping the paper-feeding mechanism when the strip is cut, after the formation of a cone; means for relieving the strain upon the paper strip at the beginning of the feed; means which allow the paper carrying reel to be started gradually to avoid breaking the strip; means for slacking the tension of the paper just before the last formed cone is severed from the strip, to allow the strip to be taken quickly into the machine; means for applying the paste to the overlapping parts of the strip; means for applying the free end of the severed strip to the next mandrel of the series; means by which the mandrel grasps the strip previous to the winding of the next cone; means for driving the mandrels, one at a time, in a direction to wind the cone; means for driving the mandrels, one at a time, in a reversed direction, to discharge the finished cone; means for burnishing the inner lap at the small end of the cone; means for stopping and starting the circular series of mandrels at the proper intervals of time; means for traversing the pasting device with the mandrel to lay the last turn or two at right angles with the axis of the cone.

In the accompanying drawings on ten sheets, Fig. 2, a front elevation of the same; Fig. 6, a plan of the cam-shaft, cams and one-toothed pinion, the driving or clutch-pulley, the slide which opens and closes the clutch and moves the paste-box and operates the center-spindle of the mandrel to catch the paper, and the tension-levers; Fig. 6$^a$, a left side elevation of the paste-box traversing device; Fig. 100 13, a central section on the line 13 13 in Fig. 16, of the mandrel when in position to receive the paper strip, with two-part center spindle, the mandrel-carrying and stripping disks.

Figure 1:
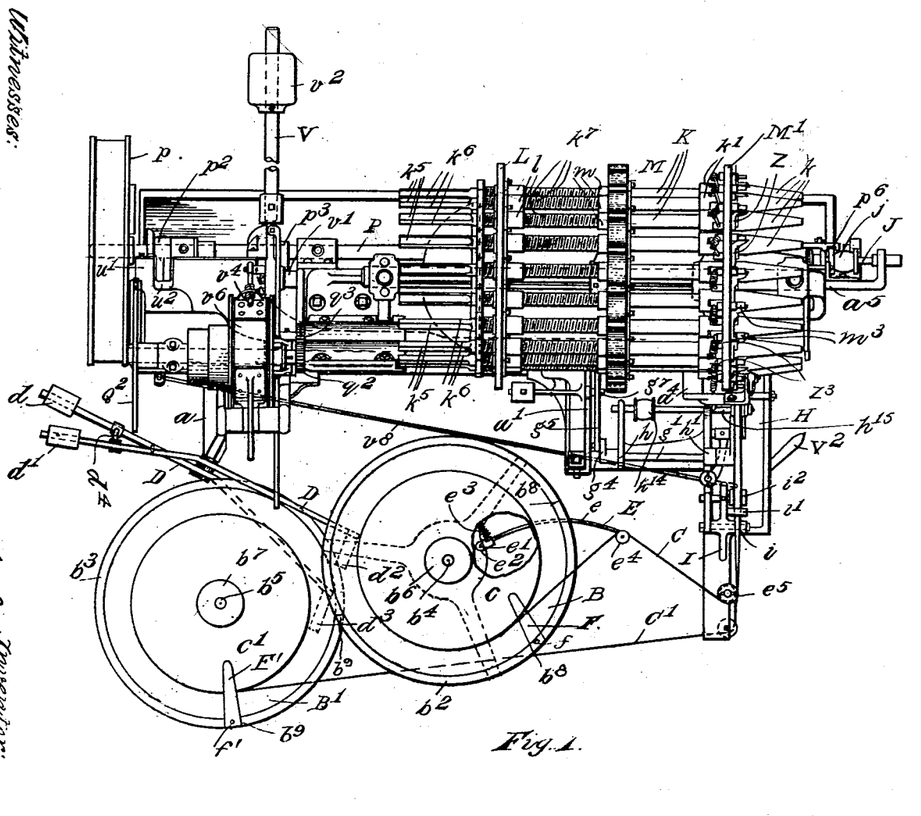
Figure 1 is a plan of a machine embodying my invention.
Figure 2:
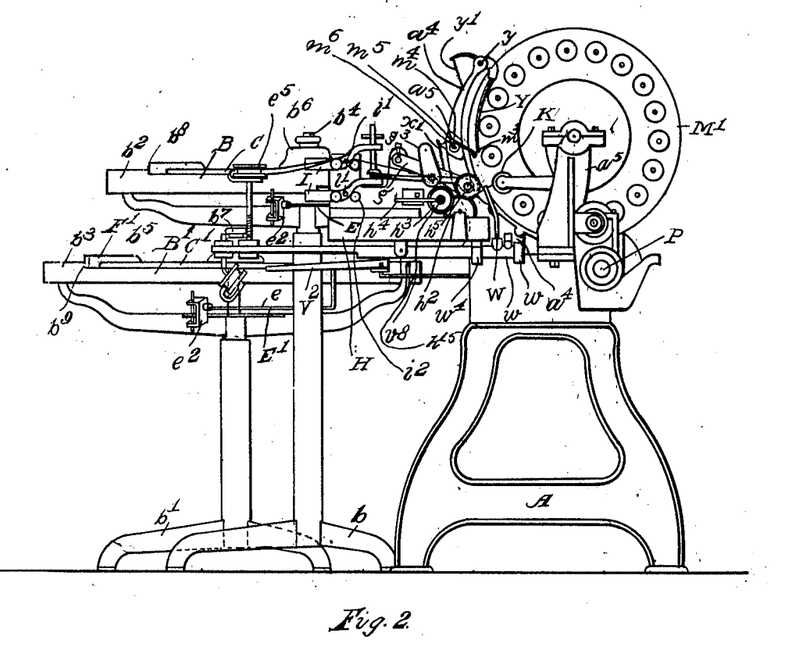

A suitable frame A supports most of the moving parts but the paper-carrying reels or turn-tables B B¹ are represented in Figs. 1 and 2 as supported on stands $b$ $b^1$ or tripods having annular tops $b^2$ $b^3$, within which said reels turn in a horizontal plane on vertical studs $b^4$ $b^5$ as the paper C C¹ is drawn from them, said stands being movable to facilitate access to the machine. The paper is in the form of narrow strips of a width which depends on the desired weight of the cone to be made therefrom, the wider the strip, the heavier the cone. These strips are wound in flat spirals $c$ $c^1$ and placed concentrically on said reels B B¹ and are unwound therefrom by the turning of the cone-forming mandrels K hereinafter described, said spirals being pressed upon said reels by the weights $b^6$ $b^7$, so that said spirals and reels turn together by friction. The reels are prevented from turning too rapidly by tension devices, represented as levers D D¹ of the first order, supported on a bracket $a$, on the rear ends of which levers are arranged adjustable weights $d$ $d^1$ to press with more or less friction the rubbers $d^2$ $d^3$ carried on the front ends of said levers, against the under surfaces of said reels.

Figure 12:
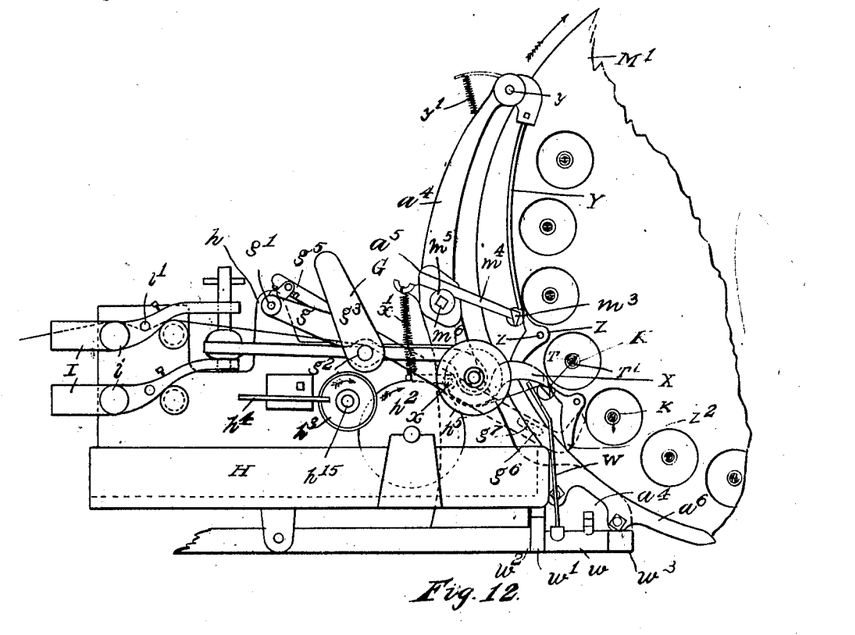
Fig. 12, a front elevation of a part of the stripper-disk and the paper looping, feeding, gripping, guiding and severing devices, the outer lap-laying devices and the finger which holds the outer lap, the presser fingers, the stationary cam which opens the presser fingers and the pasting devices.

The annular tops $b^2$ $b^3$ of the stands $b$ $b^1$ are cut down in front at $b^8$ $b^9$, to a level with the tops of the reels B B¹, to allow the strips of paper to swing laterally as the spring take-ups E E¹ vibrate in one direction under the pull of said strips and in the other direction by the resilience of said take-ups. Each take-up E E¹ is represented as consisting of a rod $e$ pivoted at $e^1$ on a bracket $e^2$ supported on the corresponding stand, the free end of said rod being thrown by a coiled spring $e^3$ toward the body of the machine and a guide-roll $e^4$ being pivoted in said free end. The rod $e$ is bent up to bring said roll on a level with the spiral of paper. The rod $e$ may be elastic and bent by the strain of the paper strip as shown in Fig. 1. A finger F F¹ is pivoted at $f$ $f^1$ on the top of each stand and is swung over the spiral of paper at the point where the strips leave said spirals to prevent the paper strips from jumping over the tops of the stands and becoming snarled and twisted. From the roll $e^4$ the paper strip passes to the left and in front of an idle roll $e^5$ and over the hub $i$ of the tension-lever I and under a tension-pin $i^1$ and over another tension-pin $i^2$, the tension-pin $i^1$ projecting horizontally from said tension-lever and the tension-pin $i^2$ projecting from an extension of the paste-box H. Thence the strip passes over the looper G which raises the paper when the winding of a cone is completed, to slacken said paper, just before severing the strip, in order to prevent the paper from breaking or pulling out of the mandrel when the following mandrel begins to wind the next cone (Fig. 12). Said looper G comprises an arm $g$ rigidly secured to a shaft $g^1$, journaled in stands $h$ $h^1$ on the paste-box H, to the free end of which arm $g$ is secured a horizontal rod $g^2$, on which is fast another arm $g^3$, the paper strip running over the rod $g^2$ between said arms $g$ $g^3$ to the pasting devices.

A crank is secured to the shaft $g^1$ and an inclined slide-rod $g^5$ is jointed to said crank $g^4$ and is provided with a longitudinal guide-slot $g^6$ which receives a pin $g^7$ projecting horizontally forward from a bracket $a^1$ on the frame A, the lower free end of said slide-rod being struck at each partial revolution of the disk M, hereinafter mentioned, by one of the journal-boxes $m$ which project from said disk M,—to rock said shaft $g^1$ and raise the rod $g^2$, to loop the paper upward, the parts of the looper being restored to position by their own weight.

A paste-roll $h^2$ journaled in the paste-box H is driven by the friction of the paper thereon and raises the paste up to the flanged doctor-roll $h^3$, which is driven by a belt (not shown) on a pulley $h^{14}$ fast on the shaft $h^{15}$ of said doctor-roll, the adjacent surfaces of said rolls running in opposite directions and the doctor-roll removing the surplus paste from the paste-roll, and said doctor-roll being cleaned of said paste by a stationary doctor-plate $h^4$ (Figs. 2 and 12). The paste-roll is narrow, having a thickness only about one third as great as the width of the paper strip and said strip is pressed against said paste-roll by a flanged guide-roll $h^5$ which holds the strip on the paste-roll in such a manner as to apply the paste for a part of the way across said strip from one edge thereof, the strip of paste being in width a little less than the width of the lap of the paper in the finished cone. From the pasting devices the strip goes to one of the cone forming mandrels K which are all alike, about twenty such mandrels, more or less, being used in one machine and preferably arranged at equal annular intervals in a circle, a cone being formed on one mandrel while a finished cone is being removed from the next following mandrel, the circle of mandrels making a complete revolution less one such angular interval, between the winding of any one cone and the removal of the same.

Figure 13:
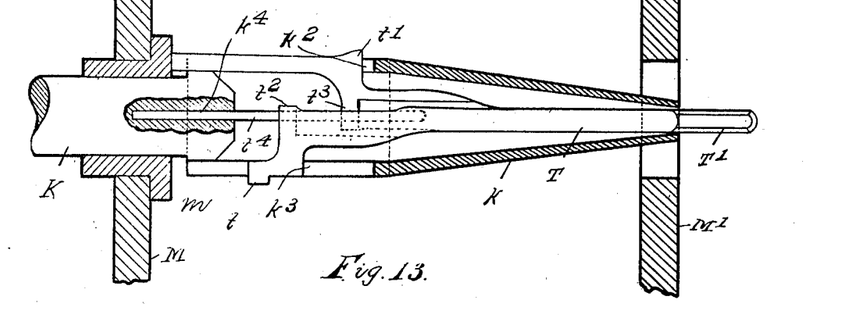
Figure 14:
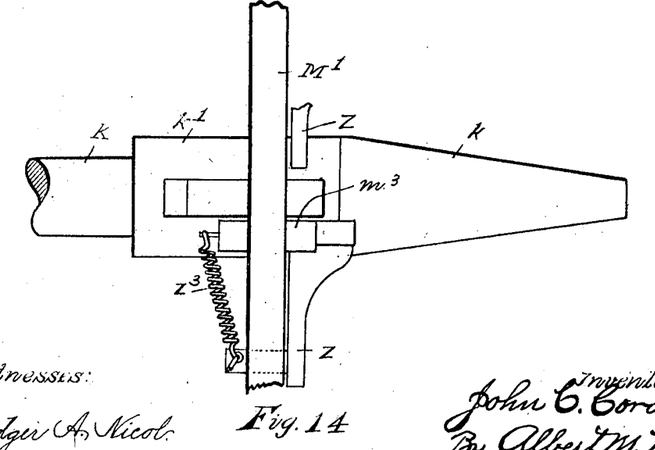
Fig. 14, a plan of a part of the stripper, and a mandrel and spring-actuated presser-finger and cutter and stripper-disk.

Each mandrel K proper is represented as consisting of a hollow cone $k$ provided with a cylindrical portion $k^1$ having on opposite sides two longitudinal guide-slits $k^2$ $k^3$. Within the hollow cone $k$ and cylinder $k^1$ is arranged a two part center-spindle, the parts of which are each half round in cross-section and are arranged within the nose or small end of the cone $k$ and together have a sliding fit therein. Each part T T¹ has a lug $t$ $t^1$ which reaches through one of said slits to enable said parts to be moved longitudinally in said cone independently of each other. Each part is provided with an inward projection $t^2$ $t^3$, through which a guide-wire $t^4$ is driven into the cylindrical part $k^4$ of the body of the mandrel. For conveniently inserting the wire $t^4$ the adjacent faces of the parts T T$^1$ may be hollow or grooved. The projections $t^2$ $t^3$ are arranged to allow the part T$^1$ to project farther out of the cone than the part T, to allow the strip of paper to be laid on the inner face of said part T$^1$. (Figs. 13, 14.) Each mandrel K has a rear end-portion which is convex on one side $k^5$ and concave on the other $k^6$, these curves being concentric with the mandrel-traversing disk L, and said mandrel has also an intermediate externally-screw threaded portion $k^7$ which passes through a nut $l$ in said disk, so that when said disk L and another disk M, which carries journal boxes $m$ in one of which the cylindrical part of each mandrel is journaled, are rotated together (both of said disks being fast on the disk-shaft N and concentric therewith) the series of mandrels are carried concentrically around said shaft N and when a mandrel is rotated in said disks said mandrel is caused to move longitudinally in said disks which are then at rest.

The shaft N, with the disks L M, is alternately rotated and prevented from rotation by a form of the "Geneva stop", so modified so as to permit the rotation to be always in the same direction. The one-toothed driving pinion O, which is of the usual form, is fast on the cam-shaft P (Figs. 4, 7 and 11) and its convex surface fits the concave openings $m^1$ of the disk M, the periphery of which corresponds to that of the stop-wheel of the Geneva stop, except that said disk M has no convex surface and that the concave openings $m^1$ serve the purpose of holding the mandrels K in position while one cone is being wound and another is being discharged, the single tooth $o$ of said pinion O engaging once in each revolution of said pinion a notch $m^2$ in said disk M.

The cam-shaft P has fast thereon a pulley $p$ which is driven by a belt $p^1$ from any suitable driver, said belt, (to avoid the complication of cams or unusual forms of gearing to vary the speed of the one-toothed driving pinion) being allowed to slip while one cone is being wound and another is being discharged.

Figure 4:
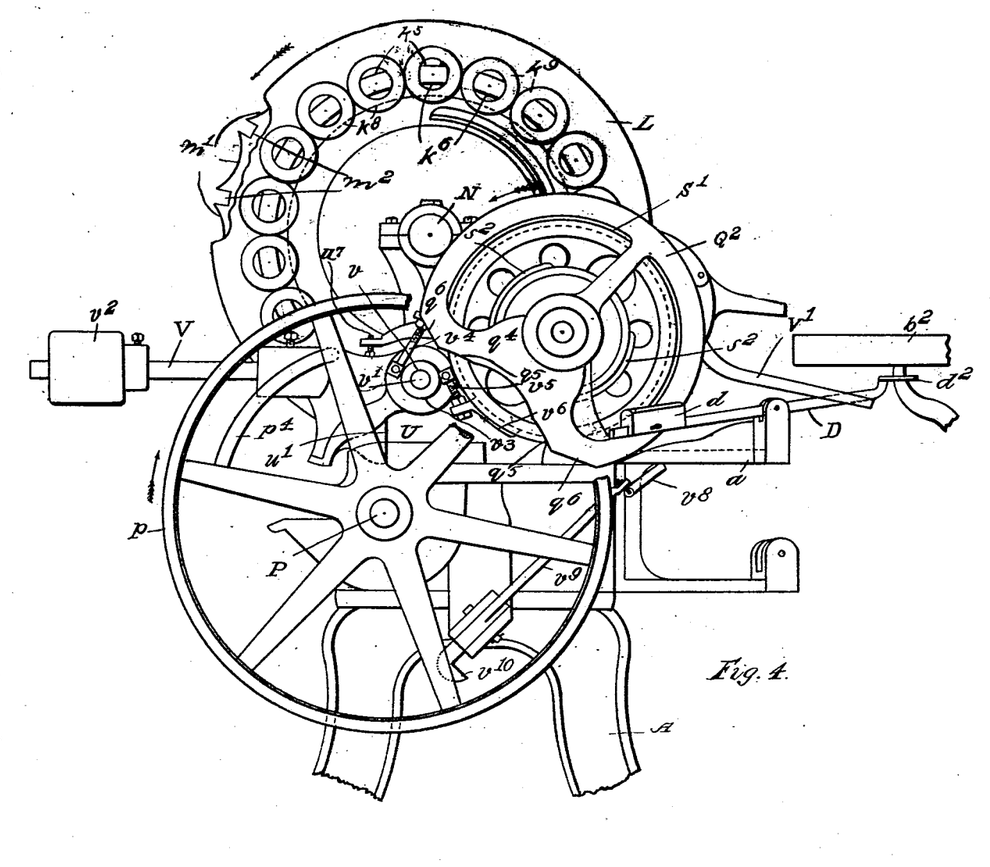
Fig. 4, a rear elevation of the machine.
Figure 5:
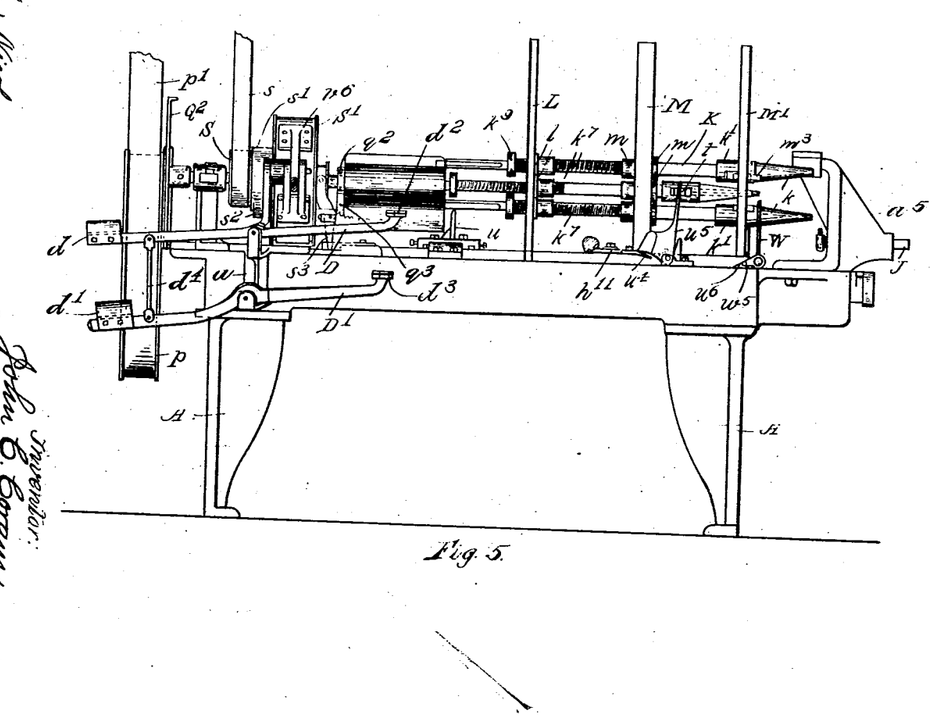
Fig. 5, a left side elevation of the driving mechanism, the clutch which drives and traverses the mandrels, some mandrels, the clutch spindle shaft stopping mechanism, the slide, the burnishing devices and the tension-levers.
Figure 7:
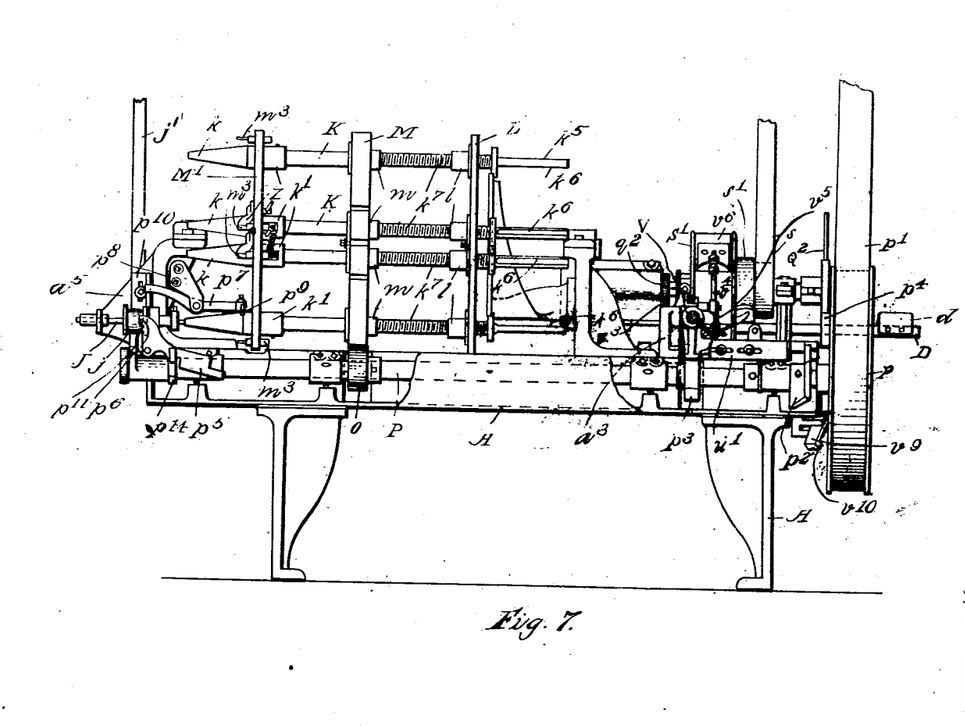
Fig. 7, a right side elevation of the machine, omitting some of the mandrels and the tension-devices.
Figure 8:
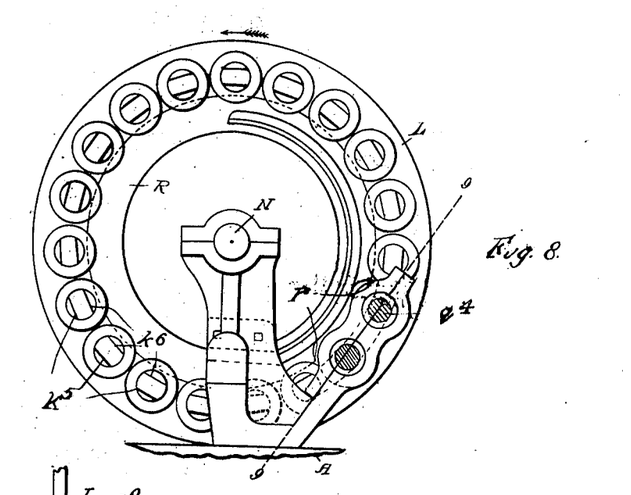
Fig. 8, a rear elevation of the mandrels, the circular guide, the disk which carries said mandrels, their supporting stands and the clutch-spindles.
Figure 9:
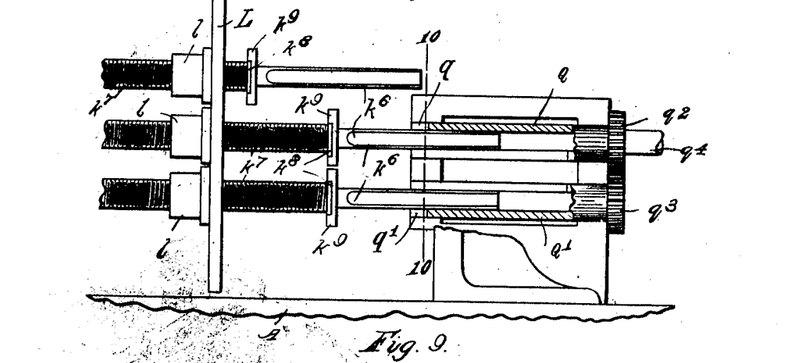
Fig. 9, a right side elevation of parts of three mandrels, the spindle-carrying disk and the clutch-spindles which drive the winding and discharging mandrels.
Figure 10:
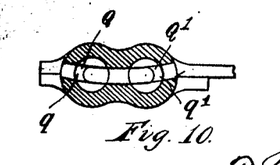
Fig. 10, a cross section on the line 10 10 in Fig. 9.

The concavo-convex shape in cross-section of the rear end-portions of the mandrels K, shown in Figs. 8, 9 and 10 and above referred to, allows said portions to enter correspondingly-shaped slots $q$ $q^1$ in the clutch-spindles Q Q$^1$ as the disks L M are turned, one mandrel (the winding mandrel) then passing out of the spindle Q, another (or discharging mandrel) from the spindle Q$^1$ into the spindle Q and another mandrel into the spindle Q$^1$. The mandrels are kept in proper position to enter said clutch-spindles by a stationary guide-ring R which fits concavities $k^8$ in the collars $k^9$ of all said mandrels, said ring R being broken away at $r$ to allow the clutch-spindles to revolve the mandrels. The clutch-spindles are connected by gears $q^2$ $q^3$ to rotate in opposite directions (Fig. 9), the spindle Q being driven by a clutch-pulley S rotated by a belt $s$, said pulley S being loose on a backward extension $q^4$ of said clutch-spindle and having a rim $s^1$ which is engaged by the brake-pulley or clutch counterpart S$^1$ (Figs. 1, 4, 5, 6 and 7) which is fast on said clutch-spindle Q, said counterpart S$^1$ having friction-arms $s^2$ pivoted inside of said counterpart S$^1$ which arms engage said rim $s^1$ on said loose pulley S when the slide U moves forward sufficiently,—a forked lever $s^3$ engaging a collar $s^4$ which slides on said clutch-spindle Q and said collar carrying links $s^5$ (Figs. 5 and 6) jointed to the front ends of said friction-arms $s^2$, the lower end of said lever $s^3$ being engaged by said slide. When the mandrels are thus revolved in opposite directions, one advances by the turning of the spindle Q to wind the paper strip from the tip to the base or larger end of the cone while the other mandrel retreats and draws out of the finished cone which is prevented from moving backward by the base of the cone last mentioned striking the front face of the stripper-disk M$^1$ which is fast on the shaft N above referred to. The backward movement of the slide U is caused by the collar $k^9$ of the discharging mandrel last named striking the vertical projection $u$ secured to said slide,—in a longitudinally adjustable manner, however, to accommodate cones of different lengths. At the same time that the slide U begins to move backward, the part T$^1$ of the center-spindle of the discharging mandrel strikes the corresponding bearing $m$ on the disk M and by the further backward movement of the mandrel is caused to project from said mandrel far enough to receive the strip of paper for the winding of the next cone. (Figs. 5 and 13.) The backward movement of the slide U, by swinging the forked lever $s^3$, above described, in the other direction, also opens the clutch, but the momentum of the moving parts is so great that it is necessary to use other means to stop the rotation of the mandrels at the proper time. The slide U (Figs. 1, 4, 6 and 7) has a projection $u^1$ which while said slide is in its forward position supports the weight of a brake-lever V pivoted at $v$ on a stud $v^1$ which projects horizontally from a bracket $a^3$ on the frame A. Said lever V is weighted at one end at $v^2$ and on opposite sides of its hub $v^3$ is connected by links $v^4$ $v^5$ to a friction strap $v^6$ which surrounds the brake-pulley S$^1$, in such a manner that the depression of the weighted end of said lever will tighten said strap and stop the rotation of said pulley $S^1$. As the slide reaches the limit of its backward movement the projection $u^1$ moves out from under said lever.

The projection $u^1$ on the slide U stands under the cam $p^2$, fast on the cam-shaft P, except when said slide is in its most rearward position, but there is a recess $u^2$ in said slide which, when the latter is in the position last-named, allows said cam $p^2$ to pass through said slide U and said cam-shaft P to revolve, causing another cam $p^3$, also fast on said shaft P, to raise the weighted lever V.

Figure 3:
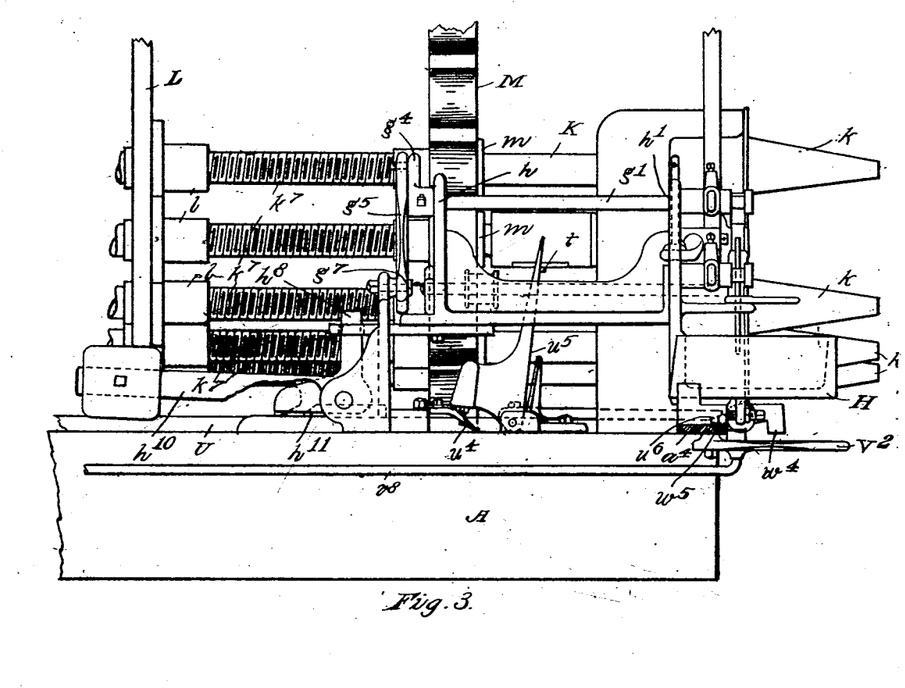
Fig. 3, a left side elevation of the winding and discharging mechanism and their operating means.
Figures 6, 6A:
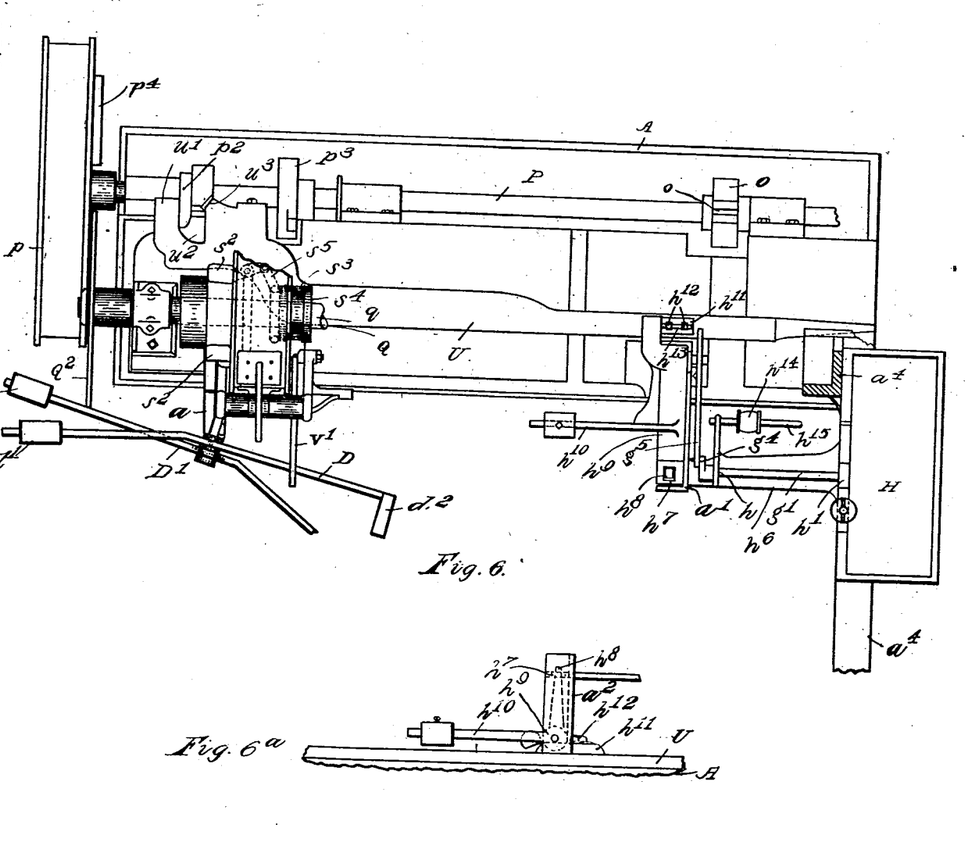
Figure 11:
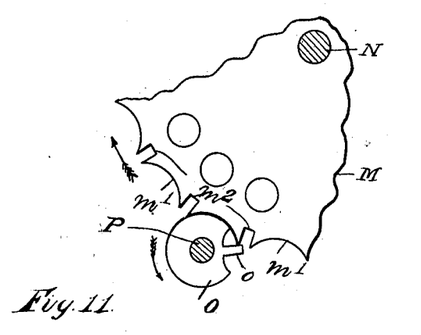
Fig. 11, a rear elevation of a part of the Geneva stop-motion.

A mutilated disk $Q^2$ fast on the clutch-spindle Q is provided with a curved recess $q^5$ which is adapted to fit an arc-shaped positioning-flange $p^4$ on the pulley $p$ and at each end of said recess the angular part where the periphery and the curvature of the recess would, if continued, meet, is cut away at $q^6$. If the clutch-spindle Q does not stop in exactly the right position, the end of the flange will strike the wall of the recess $q^5$ and turn the mutilated disk $Q^2$ and the clutch-spindle Q to the proper position in either direction. Cutting away the corners at the ends of the curved recess enables said flange $p^4$ to restore the disk $Q^2$ to position from a greater displacement. (Fig. 4.) When the clutch-spindles are in proper position, the tooth $o$ of the one-toothed pinion O enters a notch $m^2$ in the disk M and turns the latter one angular space and the cam $p^2$ strikes on the inclined side $u^3$ of the recess $u^2$ and moves the slide U forward. (Figs. 6 and 11.) When the slide U moves forward, an incline $u^4$ on said slide raises the front end of a bell-crank lever $u^5$ pivoted on the frame A and throws the upper end of said lever forward against the lug $t$ and causes the part T of the center-spindle to slide forward over the paper strip previously placed on the part $T^1$. At the same time that the part T of the center-spindle is thrown forward to grip the strip of paper, the upper part of the guide-finger W is moved against said strip and holds said strip in the plane of the paste-roll during the first turn of the mandrel, after which the strip rises above the top of said guide-finger, the lower end of said finger having a hub $w$ (Figs. 2, 3, 5 and 12) provided with a radially projecting weight-arm $w^1$ which normally throws said finger away from said strip, said hub being pivoted between lugs $w^2$ $w^3$ on a stand $a^4$ secured to the frame A. The hub $w$ is provided with a projection $w^4$ having a downwardly and backwardly inclined upper surface $w^5$ (Figs. 3 and 5) over which the undercut front end $u^6$ of the slide U runs in the forward movement of said slide, to depress said projection $w^4$ and rock said hub. The backward movement of the slide U (caused by the backward movement of the discharging mandrel as above described) commences when the new cone is nearly wound. Without the guide-finger W the forward movement of the mandrel would crowd the strip of paper forward and tend to wind the paper with a greater pitch than that of the screw-threaded part $k^7$ of the mandrel, making the pitch of the cone longer at the small end. By adjusting the upper end of the guide-finger so that it shall press the paper slightly to the rear of the plane of the paste-roll the first wind of the cone will be annular instead of spiral and the smaller end of said cone will not need to be trimmed.

Figure 15:
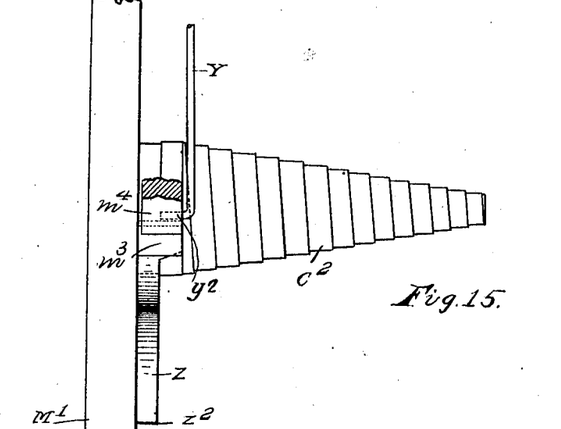
Fig. 15, a left side elevation of a part of the stripper-disk, the stationary cutter, a presser-finger, the lap laying and holding finger and a cone.
Figure 16:
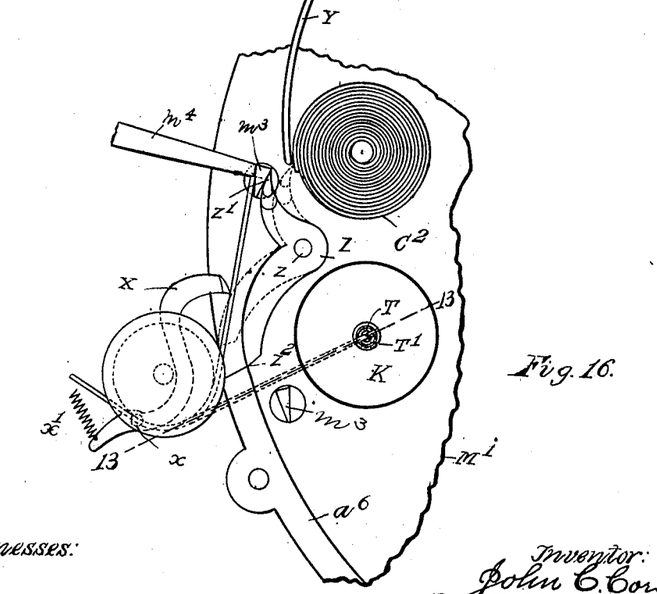
Fig. 16, an enlarged front elevation of a part of the stripper-disk and other parts shown in Fig. 15, and of the guide-roll and feed-lever.

The paper cone is usually reinforced at the larger end by one or more annular turns of the paper strip at right angles to the axis of the mandrel, as shown and described in previous patent and at the same time the base of the cone is thereby adapted to support the cone when filled with yarn and placed on a bench or table in a vertical position. Means are therefore provided for moving the paste-box forward with the mandrel while the reinforcing turns of the paper are being laid. The paste-box H slides in the stand $a^4$ parallel with the axes of the mandrels (Figs. 1, 5, 6 and 6$^a$) and is provided with a backwardly extending arm $h^6$ and its rear end portion is represented as provided with a hole $h^7$ which receives the upper end of a radial arm $h^8$ secured to a rock-shaft $h^9$ arranged at right angles to the path of the slide, said rock-shaft having a backwardly extending arm $h^{10}$, the rear end of which is raised by a cam-piece $h^{11}$, secured on the top of the slide U as by bolts $h^{12}$ which pass down through a slot $h^{13}$, to permit said piece $h^{11}$ to be moved backward or forward on said slide, to increase or diminish the amount of the reinforcement or the distance through which the paste-box shall travel with the mandrel on which the cone is being wound. When the winding of the cone is completed the above described partial rotation of the disks L M $M^1$ takes place and the severing of the paper strip from the newly wound cone is accomplished by means (Figs. 1, 2, 12 and 14) of a cutter $m^3$ secured on the front of said stripper-disk $M^1$ (there being as many such cutters as there are mandrels) and a stationary cutter $m^4$, there being one such stationary cutter secured on the stand $a^4$, said last-named cutter being arranged in a groove $a^5$ in said stand and held from accidental movement by a washer $m^5$ and screw $m^6$ which being loosened allow the cutter $m^4$ to be adjusted endwise to its proper position with relation to the moving cutters $m^3$. The paper when being wound runs from the paste-roll and guide-roll above a movable or stripper-disk cutter $m^3$ so that when the stripper-disk $M^1$ is turned to bring the next mandrel into winding position the strip is severed between the cutters $m^3$ $m^4$. At the same movement of the disk $M^1$ the part of the paper strip which projects from the paper cone passes under and is pressed against the body of said cone by the spring lap-laying finger Y, (Figs. 1, 12 and 16) pivoted at $y$ on the stand $a^4$ and forced by a tension spring $y^1$ against said paper-cone. The lap-laying finger Y is represented in Fig. 15 as a wire bent at right angles at its lower end $y^2$ toward the disk $M^1$ to extend across said paper-strip. Just before the end of the strip or outer lap reaches the lower end of the finger Y, the upper end of the presser-finger Z, pivoted at $z$ on the stripper-disk $M^1$ is forced by the spring $z^3$ against said lap. The finger Z has been held by the stationary cam $a^8$, supported on the stand $a^4$, out of engagement with the paper cone but at this time rises above said cam.

The upper end of a feed-lever X, pivoted at $x$ on the stand $a^4$, is held by the paper-strip and is thrown by a spring $x^1$ when said strip is cut forcing the free end of said strip on to the part $T^1$ of the next mandrel. When the paper cone is being wound, the tension-lever D (Figs. 1, 4, 6 and 7) is held out of contact with the corresponding reel B by a tension-releasing lever $V^1$ pivoted between its ends on a stand $a$ with its left arm reaching over or resting upon the front arm of said lever D, the other arm of said lever $V^1$ extending to a point between the fulcrum $v^1$ and the weighted end $v^2$ of the lever V and having an adjusting screw $u^7$ which rests upon said lever V in such a manner that when said weighted end is raised, the rubber $d^2$ is depressed out of contact with said reel B.

A hand-lever $V^2$ (Figs. 1, 3, 4 and 7) is connected by a link $v^8$ to a lever $v^9$, in such a manner that by moving said hand-lever a hook $v^{10}$ on the lower end of said lever $v^9$ is thrown in the path of the flange $p^4$ (above described) and stops the rotation of the cam-shaft P.

The burnisher is simply a rod J or shaft on which the pulley $j$ is fast, said pulley being driven constantly by a belt $j^1$ from the same shaft which drives the pulleys P S. A cam $p^{14}$ secured on the front end of the cam-shaft P raises the rear end of the lever $p^5$, pivoted on the frame and having a notch $p^6$ (Figs. 1 and 7) which engages one of the flanges of said pulley $j$ and throws said rod J and pulley forward, the rear of said lever $p^5$ being heavy enough to rock said lever in the other direction, when the cam has passed it and throwing the rounded rear end of said rod into the small end of the paper cone $C^2$ and pressing down the inner lap.

The lever $p^7$ is pivoted in a bracket $p^8$ supported on the stand $a^5$ rigidly secured to the frame of the machine and carries at the rear end a set of type $p^9$ adapted to print or stamp a trade-mark, a date, or the name of the manufacturer, the other or front end of said lever is jointed to a slide $p^{10}$ which is raised by another cam projection $p^{11}$ on the same cam $p^{14}$ to press the type into the cone. (Fig. 7.)

The object in having two reels or turntables B $B^1$ is that another spiral $c$ or $c^1$ may be in readiness to be introduced into the machine without delay when one spiral is exhausted and the end of the new strip is placed in the proper relation to the corresponding take-up and tension-lever before the running strip is run out so that the single lever $V^1$ above described serves the purpose of taking the pressure of each tension-lever D or $D^1$ off from the corresponding reel.

I claim as my invention:—

1. The combination of a mandrel having a hollow conical free end, a center spindle having two parts, movable on each other, means for sliding one of said parts over a strip of paper placed on the other, means for revolving said mandrel about its axis and means for giving a longitudinal movement to said mandrel simultaneously with said revolving movement and pasting devices.

2. The combination of a stripper, two mandrels, means for rotating said mandrels simultaneously in opposite directions and means for simultaneously moving said mandrels longitudinally in opposite directions, to wind a strip of sheet material into a cone on one of said mandrels and at the same time to discharge a cone previously wound on the other of said mandrels.

3. The combination of an endless series of mandrels arranged at equal intervals from each other, means for moving said series intermittently in one direction an amount equal to one of said intervals, means for rotating two adjacent mandrels simultaneously in opposite directions, means for moving said two mandrels last named longitudinally and simultaneously in opposite directions, to wind a strip of sheet material into a cone on one mandrel and to discharge a cone previously wound from another of said mandrels and to retain cones on the other mandrels until said cones are dry enough to keep their form.

4. The combination of a stripper-disk, a mandrel, movable with said disk, means for rotating the same to wind a strip of sheet material into a cone, a cutter carried by said disk below said strip, a stationary cutter, means for rotating said disk when the winding of said cone is completed, to carry said first named cutter past said stationary cutter in proximity thereto, to sever said strip.

5. The combination of a stripper-disk, a mandrel movable with said disk, means for rotating said mandrel to wind a strip of sheet material thereon into a cone, means for severing said strip when the winding of said cone is completed, a spring-actuated finger, means for rotating said disk to bring the severed end of said strip under said finger before said strip is severed, to lay the same upon the base of said cone.

6. The combination of a stripper-disk, a mandrel movable with said disk, means for rotating said mandrel to wind a strip of sheet material into a cone, means for severing said strip when the winding of a cone is completed, a spring-actuated finger, means for rotating said disk to bring said strip under said finger before said strip is severed, to lay the lap on the base of said cone, a presser finger, a spring to press said last named finger against the end portion of said strip and a stationary cam to hold said last named finger out of contact with said cone until after the severing of said strip.

7. The combination of a stripper-disk, a mandrel movable therewith, means for rotating said mandrel to wind a strip of sheet material into a cone, means for severing said strip when the winding of a cone is completed, a spring-actuated finger, means for rotating said disk to bring said cone-end of said strip under said finger before said strip is severed, to lay the same upon the base of said cone, a presser-finger, a spring to press said last named finger against the end portion of said strip, and a stationary cam to hold said last-named finger out of contact with said cone until said strip is severed, said last named finger having an end adapted to pass under the free end of said first-named finger.

8. The combination of a stripper-disk, mandrels movable with said disk, means for intermittently rotating said mandrels successively to wind a strip of sheet material into cones, means for severing the strip when the winding of a cone therefrom is completed, a feed-lever having its upper end supported on said strip, at a greater distance from the mandrel carrying said last-named cone than the point of severing said strip, and raised by the tension of said strip when said disk is partially rotated, said upper end of said feed-lever being adapted to fall when said strip is severed and to carry the adjacent end of said strip to the next mandrel.

9. The combination of a mandrel, means for rotating the same to wind a strip of sheet material thereon, means for imparting a longitudinal movement to said mandrel during its rotation, to form a cone upon said mandrel, devices adapted to apply paste to said strip and means for causing said pasting devices to travel with the longitudinal movement of said mandrel during a part of its rotation to wind said strip in annular turns.

10. The combination of a series of mandrels, each provided with a hollow conical tip, a center-spindle formed in two parts, means for causing one of said parts to project in front of said cone, means for causing the other of said parts to slide over said first named part, means for intermittently rotating two adjacent mandrels simultaneously in opposite directions and means for stopping the rotation of one of said mandrels during the projection of said first named spindle part, to receive a strip of sheet material to be wound on said mandrel.

11. The combination of a series of mandrels, each provided with a hollow conical tip, a center-spindle formed in two parts, means for causing one of said parts to project in front of said cone and means for intermittently rotating two adjacent mandrels simultaneously in opposite directions, means for stopping the rotation of one of said mandrels during the projection of said first named spindle-part, to receive a strip of sheet material to be wound on said mandrel, and means for projecting said second named spindle part to grasp said strip between said parts.

12. The combination of a series of mandrels arranged in a circle, means for supporting the same, means for causing said series to have an intermittent rotary movement about the center of said circle and means for normally preventing the rotation of all but two of said mandrels.

13. The combination of a connected series of mandrels, arranged at equal intervals, two clutch-spindles and means for rotating said spindles a predetermined number of turns in opposite directions, said mandrels and clutch-spindles being adapted to engage each other one at a time to rotate two mandrels simultaneously in opposite directions, to wind a strip of paper into a cone upon one of said mandrels and to discharge from the other of said mandrels a paper cone previously wound thereon.

14. The combination of a connected series of mandrels, arranged at equal intervals, two clutch-spindles, means for rotating said spindles a predetermined number of turns in opposite directions, said mandrels and clutch-spindles being adapted to engage each other one at a time, to rotate two mandrels simultaneously in opposite directions, to wind a strip of paper into a cone upon one of said mandrels and to discharge from the other of said mandrels a paper-cone previously wound thereon, and means for guiding said mandrels one at a time into one of said clutch-spindles and from one of said spindles into and out of the other.

15. The combination of a connected series of mandrels, arranged at equal intervals, two clutch-spindles, means for rotating said spindles a predetermined number of turns in opposite directions, said mandrels and clutch-spindles being adapted to engage each other one at a time, to rotate two mandrels simultaneously in opposite directions, to wind a strip of paper into a cone upon one of said mandrels and to discharge from the other of said mandrels a paper-cone previously wound thereon, means for guiding said mandrels one at a time into one of said clutch-spindles and from one of said spindles into and out of the other, said spindles having concavities, and a stationary guide-ring adapted to enter and fit said concavities to prevent said mandrels from turning, a portion of said ring being broken away to allow said mandrels to be revolved by said spindles.

16. The combination of a connected series of mandrels, arranged at equal intervals, two clutch-spindles, said mandrels and clutch-spindles being adapted to engage each other one at a time, to rotate two mandrels simultaneously in opposite directions, to wind a strip of paper into a cone upon one of said mandrels and to discharge from the other of said mandrels a paper cone previously wound thereon, and a two-part clutch, one counterpart of which is fast on one of said clutch-spindles, means for rotating the other counterpart of said clutch, means for closing said clutch to wind a cone and means for opening said clutch when the winding of said cone is completed.

17. The combination of a connected series of mandrels arranged at equal intervals from each other and each provided with means for engaging a strip of paper, two clutch-spindles, said mandrels and clutch-spindles being adapted to engage each other one at a time, to rotate two mandrels simultaneously in opposite directions, to wind a strip of paper into a cone on one of said two mandrels and to discharge from the other of said two mandrels a cone previously wound thereon and means for positioning one of said mandrels, to receive a strip of paper and the other to be disengaged from a clutch-spindle.

18. The combination of a connected series of mandrels arranged at equal intervals from each other and each provided with means for engaging a strip of paper, two clutch-spindles, said mandrels and clutch-spindles being adapted to engage each other one at a time, to rotate two mandrels simultaneously in opposite directions, to wind a strip of paper into a cone on one of said two mandrels and to discharge from the other of said two mandrels a cone previously wound thereon, a mutilated disk concentrically secured to one of said clutch-spindles and having a curved recess, and a positioning pulley having a curved surface adapted to enter and fit said recess and to move said clutch-spindles and mandrels into their proper position relatively to each other.

19. The combination of a connected series of mandrels arranged at equal intervals from each other and each provided with means for engaging a strip of paper, two clutch-spindles, said mandrels and clutch-spindles being adapted to engage each other one at a time, to rotate two mandrels simultaneously in opposite directions, to wind a strip of paper into a cone on one of said two mandrels and to discharge from the other of said two mandrels a cone previously wound thereon, a mutilated disk concentrically secured to one of said clutch-spindles and having a curved recess, and a positioning pulley having a curved flange adapted to enter and fit said recess and to move said clutch-spindles and mandrels into their proper positions relatively to each other, the ends of said recess being removed to allow said curved surface to restore said disk to position from a greater displacement.

20. The combination of a connected series of mandrels arranged at equal intervals from each other and each provided with means for engaging a strip of paper, two clutch-spindles, said mandrels and clutch-spindles being adapted to engage each other one at a time, to rotate two mandrels simultaneously in opposite directions, to wind a strip of paper into a cone on one of said two mandrels and to discharge from the other of said two mandrels a cone previously wound thereon, a mutilated disk concentrically secured to one of said clutch-spindles and having a curved recess, and a positioning pulley having a curved flange adapted to enter and fit said recess and to move said clutch-spindles and mandrels into their proper positions relatively to each other, the middle portion of said recess being deepened to allow said disk to be more easily moved by said flange.

21. The combination of a slide, means for giving the same a forward movement, clutch-spindles, mandrels, engaged by said clutch-spindles, a clutch-pulley loose on a clutch-spindle, a brake-pulley fast on said clutch-spindle, said pulleys forming clutch-counterparts adapted to engage each other, and connecting means between said slide and one of said counterparts to engage said counterparts.

22. The combination of a slide, means for giving the same a forward movement, a mandrel, means for rotating the same, a center-spindle formed in two parts carried by said mandrel and connecting means between said slide and one of said spindle-parts to move the same, to grasp a strip of paper between said parts.

23. The combination of a slide, means for giving the same a forward movement, a mandrel adapted to grasp a strip of paper, a guide-finger arranged to turn on a stationary pivot, and means for normally turning said finger away from said strip, said finger being adapted to be engaged by said slide to press said finger against said strip.

24. The combination of a slide, means for giving the same a backward movement, clutch-spindles, mandrels engaged by said clutch-spindles, a clutch-pulley loose on a clutch-spindle, a brake-pulley fast on the last-named clutch-spindle, said pulleys forming clutch-counterparts adapted to engage each other, connecting means between said slide and one of said counterparts to disengage said counterparts, and means for stopping the rotation of said brake-pulley.

25. The combination of a slide, means for giving the same a backward movement, clutch-spindles, mandrels engaged by said clutch-spindles, a clutch-pulley loose on a clutch-spindle, a brake-pulley fast on the last-named clutch-spindle, said pulleys forming clutch-counterparts adapted to engage each other, connecting means between said slide and one of said counterparts to disengage said counterparts, a weighted lever, means for raising said lever during the forward movement of said slide and for resting said lever on said slide, said lever being dropped by the backward movement of said slide, and a friction-strap surrounding said brake-pulley and tightened thereon by the falling of said lever.

26. The combination of mandrels, two clutch-spindles, each adapted to engage said mandrels, one at a time, two clutch-counterparts arranged on one of said spindles, one of said counterparts being fast on said spindle and the other being loose thereon, means for engaging said counterparts with each other, means for disengaging said counterparts from each other, means for stopping the rotation of said spindle and means for positioning said spindle.

27. The combination of a series of mandrels, a rotary shaft having a projection, connecting means between said shaft and said mandrels to bring said mandrels successively into working position, means of rotating said mandrels at intervals and a slide adapted to engage said projection to prevent the rotation of said shaft while said mandrels are rotating.

28. The combination of a mandrel, a burnisher-rod having a rounded end, means for constantly rotating said rod and means for giving a longitudinal movement to said rod, to force said rounded end into the small end of a cone carried by said mandrel, to press down the inner lap of said cone.

29. The combination of a lever, type carried by said lever, a mandrel, a cam-shaft and connecting means between said lever and said shaft, to operate said lever to press said type against a cone on said mandrel.

In witness whereof, I have affixed my signature in presence of two witnesses.

JOHN C. CORAM.

Witnesses:
ALBERT M. MOORE,
GRACE CROWLEY.